United States Patent [19]

Behle

[11] 4,106,749

[45] Aug. 15, 1978

[54] BOTTOM OPERABLE AIR INLET AND OUTLET VALVE ASSEMBLY

[75] Inventor: Gunter R. Behle, St. Charles, Mo.

[73] Assignee: ACF Industries, Incorporated, New York, N.Y.

[21] Appl. No.: 757,121

[22] Filed: Jan. 5, 1977

[51] Int. Cl.² .................................................. F16K 51/00
[52] U.S. Cl. ........................................ 251/144; 137/587
[58] Field of Search ........................ 137/583, 586, 587; 251/144, 77

[56] References Cited

U.S. PATENT DOCUMENTS

| | | | |
|---|---|---|---|
| 1,523,484 | 1/1925 | Lindstrom | 137/586 |
| 1,727,702 | 9/1929 | Folmsbee | 251/144 X |
| 3,486,528 | 12/1969 | DeFrees | 137/587 |

Primary Examiner—Robert G. Nilson
Attorney, Agent, or Firm—Henry W. Cummings

[57] ABSTRACT

In accordance with the present invention an air inlet and outlet valve is mounted within an opening in the top of a railway tank car. The valve is operable from the bottom of the car by means of a rotatable operating shaft which extends from the bottom of the car up through the tank to the top of the tank to operate the valve. The operating shaft includes an operator for raising and lowering the valve located at the bottom of the tank, and includes a shaft telescoping arrangement whereby the upper portion of the shaft telescopes relative to the lower portion of the shaft, as the top of the tank moves relative to the bottom of the tank. Thus when the car is impacted and the top of the tank moves downwardly relative to the tank bottom, the upper portion of the operating shaft will move downwardly relative to the lower portion of the shaft, and the valve will remain closed during such impacts, while allowing opening and closing of the valve from the bottom of the car by means of the operating shaft and the operator.

17 Claims, 8 Drawing Figures

BOTTOM OPERABLE AIR INLET AND OUTLET VALVE ASSEMBLY

BACKGROUND OF THE INVENTION

In U.S. Pat. No. 3,981,481 granted Sept. 21, 1976 assigned to the same assignee as the present application, a bottom operable tank car lading loading and unloading valve is disclosed. Other bottom operable tank car lading valves are disclosed in U.S. Pat. Nos. 3,227,101; 3,591,131; 3,661,355; 3,721,424. These bottom operable tank car lading valves allow the operator to operate the lading valve without going on top of the car. Thus the danger of the operator falling off the car while operating the lading valve is reduced when such a bottom operable lading valve is utilized.

However during loading and unloading a tank car it is necessary to provide a valve to allow air to enter the car during unloading and allow air to leave the car while the car is being loaded. In the past most such air inlet and air outlet valves have been located on top of the car, and operable from the top of the car. Thus the operator must climb on top of a car in order to operate most of the prior art air inlet and outlet valves during loading and unloading the car. Thus to improve operator safety it would be desirable to make the air inlet and outlet valve operable from the bottom of the car.

In U.S. Pat. No. 3,486,528 an air inlet and outlet valve is disclosed which is located on top of the tank. An operating shaft extends from the bottom of the tank up through the tank to the air inlet and outlet valve, and the valve is operable from the bottom of the tank, thus avoiding the need for the operator to go on top of the car to operate the valve.

However when a railway tank car is impacted, the top of the tank moves downwardly relative to the bottom of the tank for up to three inches or more. If the bottom operable valve structure shown in U.S. Pat. No. 3,486,528 were utilized in a railway tank car, when the car is impacted, the top of the tank would move downwardly relative to the bottom of the tank, the valve would open, resulting in the loss of vapors and/or liquid lading.

THE DRAWINGS

FIG. 2 is a sectional view looking in the direction of the arrows along the line 2—2 in FIG. 1 illustrating the lower portion of the air inlet and outlet valve assembly of the present invention;

SUMMARY OF THE INVENTION

In accordance with the present invention an air inlet and outlet valve is mounted within an opening in the top of a transportation tank. The valve is operable from the bottom of the tank by means of a rotatable operating shaft which extends from the bottom of the tank through the tank to the top of the tank to operate the valve. The operating shaft includes shaft operating means located at the bottom of the tank, and shaft telescoping means located within the tank such that the upper part of the operating shaft may move vertically relative to the lower portion of the shaft, as the top of the tank moves relative to the tank bottom. Thus when the top of the tank moves downwardly relative to the tank bottom, the upper portion of the operating shaft will move downwardly relative to the lower portion of the shaft by virtue of the shaft telescoping means and the valve will remain closed during such impacts, while allowing opening and closing of the valve from the bottom of the tank by means of the operating shaft and the shaft operating means. The shaft telescoping means may comprise at least one fork located in the operating shaft.

DESCRIPTION OF PREFERRED EMBODIMENTS

The air inlet and outlet assembly of the present invention may be utilized in an overland tank truck, an intermodel truck container or in a container mounted in a ship. However, the air inlet and outlet valve assembly of the present invention is particularly adapted for use in a railway tank car. Therefore the assembly will be described and illustrated in connection with its application to a railway tank car.

Figure 1:
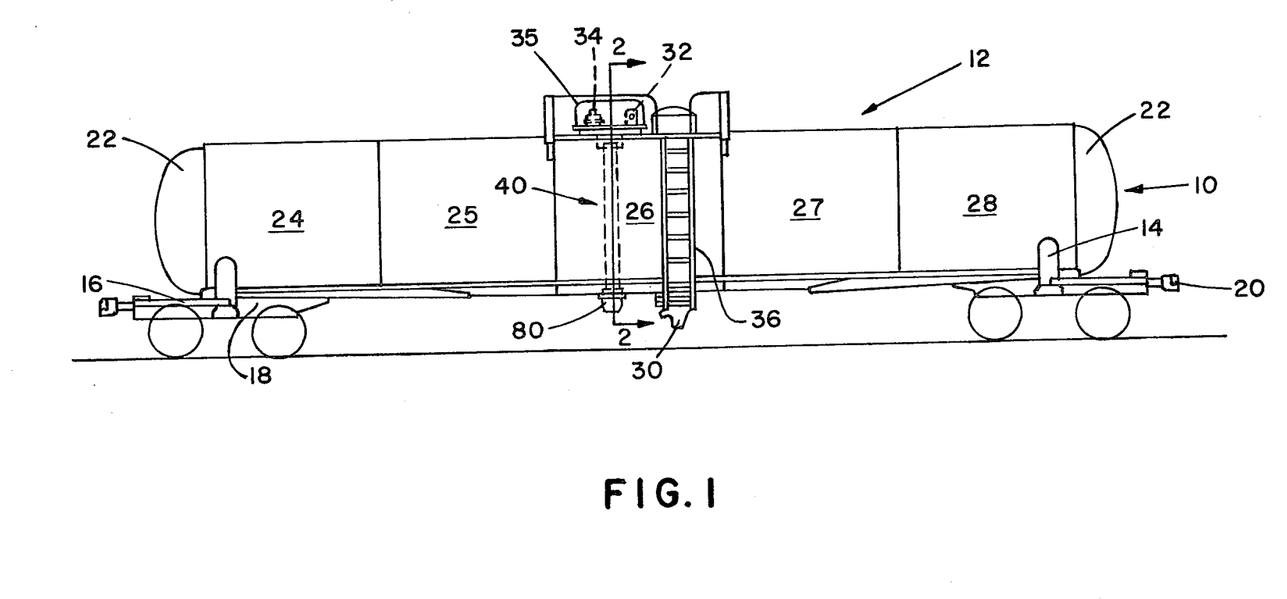
FIG. 1 is a side elevation view of a railway tank car in which the air inlet and outlet valve assembly of the present invention may be mounted.

In the drawings, a railway tank car 10 is illustrated in which a tank 12 is mounted upon cradles 14 which are supported by stub sills 16 and trucks 18 at opposite ends of the car. A conventional coupler 20 and a draft gear (not shown) are mounted within the stub sills. The tank includes end portions 22 and tank sections 24, 25, 26, 27 and 28 welded together to form an integral tank.

The tank car may be loaded and/or unloaded through a bottom operated lading valve 30, for example, constructed according to the teachings of U.S. Pat. No. 3,981,481 granted Sept. 21, 1976, assigned to the same assignee as the present application, or according to the teachings of one or more of U.S. Pat. Nos. 3,227,101; 3,591,131; 3,661,355; or 3,721,424.

Normally an air outlet valve 32 and a vacuum relief valve 34 are provided on the top of the car within syphon housing 35. A ladder 36 is provided for the operator to climb to the top of the car to operate the air outlet valve when the tank is loaded. During loading the air outlet valve 32 must be manually opened to allow air to escape. During unloading of the car the vacuum relief 34 valve opens for air to enter to replace lading which is removed from the tank. However, the vacuum relief valve must be inspected periodically from the top of the car to ascertain that it is operating properly.

However the operator being on top of the car constitutes a safety hazard. The operator can slip or trip, falling off the tank and causing injury to himself.

Figure 2A:
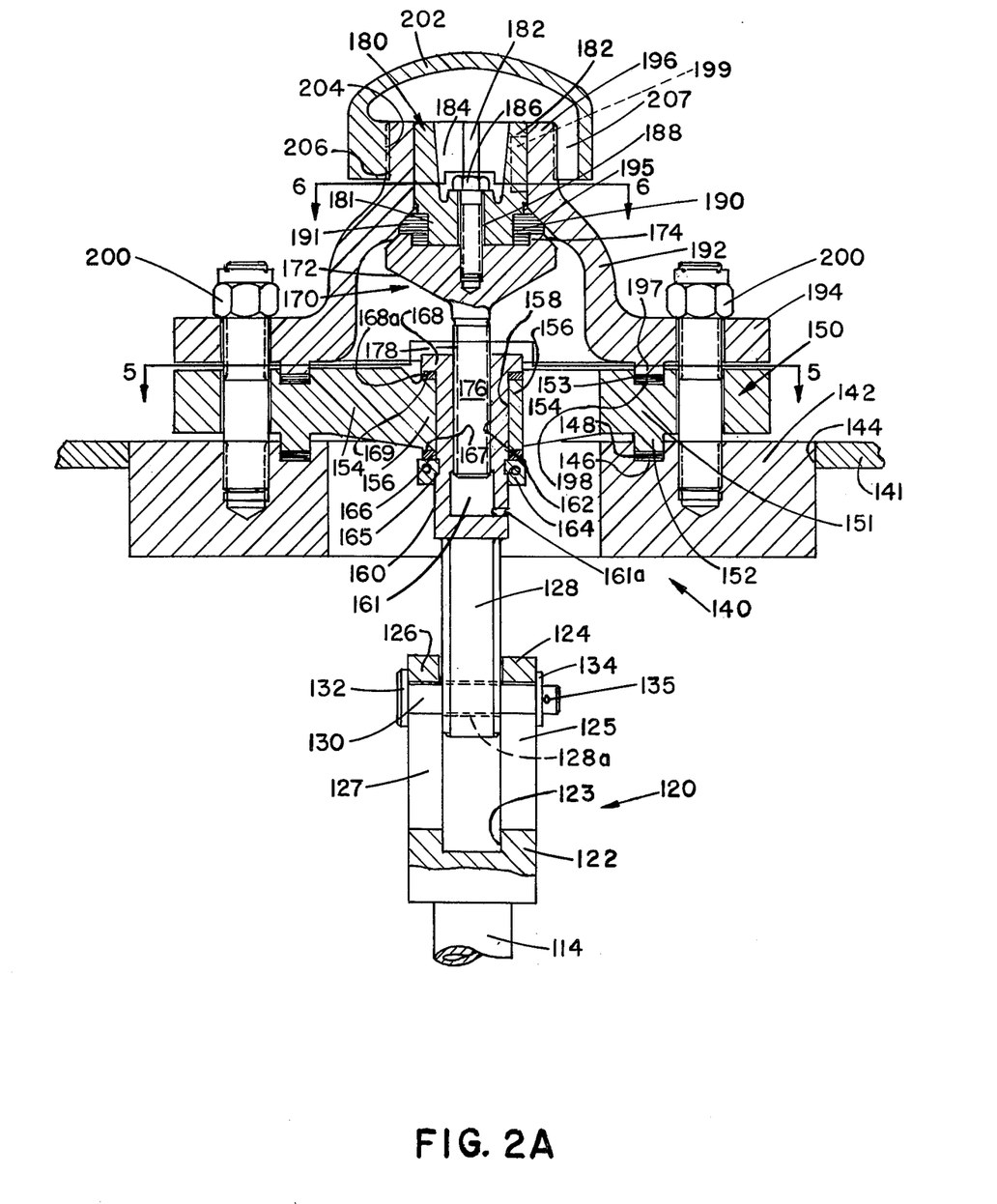
FIG. 2A is a view looking in the direction of the arrows along the line 2—2 in FIG. 1 illustrating the upper portion of the air inlet and outlet valve assembly of the present invention.
Figure 3:
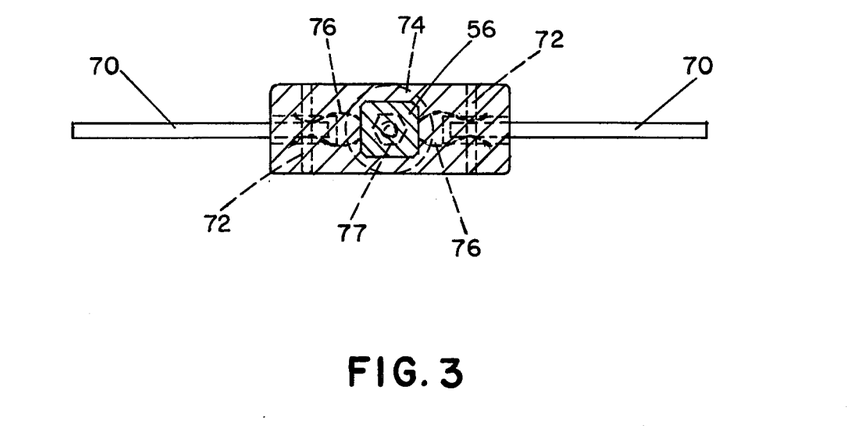
FIG. 3 is a sectional view looking in the direction of the arrows along the line 3—3 in FIG. 2.
Figure 4:
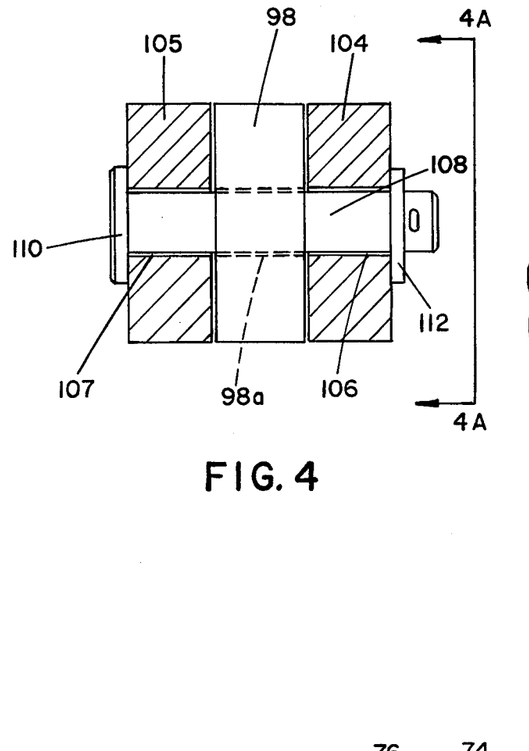
FIG. 4 is a sectional view looking in the direction of the arrows along the line 4—4 in FIG. 2.

In accordance with the present invention the air outlet valve and/or the vacuum relief valve are replaced with the air inlet and outlet valve assembly 40 which is operable from the bottom of the car. As shown in FIGS. 2-4, this assembly includes a housing 42 attached to an opening 44 in the bottom 13 of tank 12. Housing 42 includes a contoured opening 45 adapted to contain an operating shaft 46 extending up through the tank to operate the air inlet and outlet valve 170 to be described hereinafter. The shaft 46 includes slot means 100 and 120 to allow the upper portion 128 of shaft 46 to move relative to the lower portion 98 of shaft 46, as the tank top moves relative to the tank bottom. Shaft operating means 55 are provided at the bottom of the tank for rotating shaft 46 to raise and lower valve 172.

Housing opening 45 is contoured to receive shaft sealing means 48 including o-ring 49 and U-cups 50 for sealing shaft 46 relative to the inside of the tank 12. A sealing retainer 52 is held in place by suitable fastenrs 54 extending into housing 42. Shaft 46 includes a lower depending portion 56 extending into an enlarged base portion 67. Base portion 67 includes cutout portion 68 within which handles 70 are mounted upon horizontally extending pins 72.

A plate 74 having handle locks 76 attached thereto (FIG. 3) is held in place by means of threaded fasteners 77 extending into threaded opening 78 in depending portion 56 of shaft 46.

A removable cap 80 threadably engages threaded portion 82 of housing 42. When cap 80 is removed, handles 70 can be pivoted about pins 72, against the bias of handle locks 76 into a horizontal position (FIG. 3) to rotate shaft 46.

A thrust washer 86 for shaft 46 is provided on the upper surface of housing 42, and shaft 46 is provided with a shoulder plate 88 to engage thrust washer 86. A shaft retainer 90 is provided with a contoured opening 92 which defines a shoulder 94 which engages the upper surface of shaft plate 88. Fasteners 95 hold shaft retainer 90 in place.

Shaft 46 includes a first upwardly extending portion 98 of square cross section. Shaft 46 further includes first shaft telescoping means indicated generally at 100.

Figure 4A:
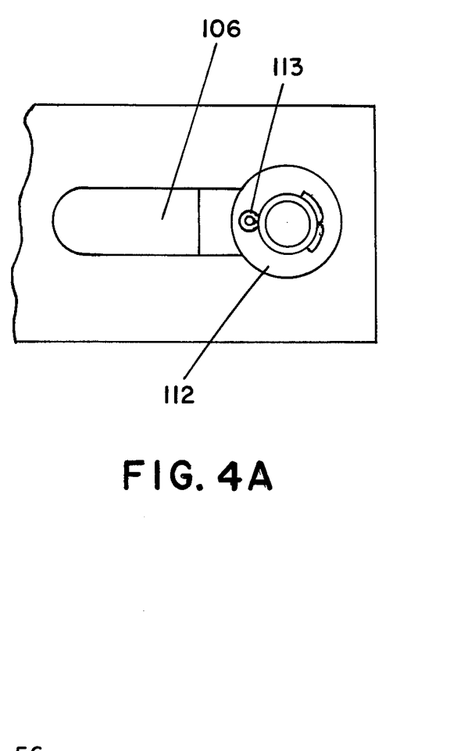
FIG. 4A is a view looking in the direction of the arrows along the line 4—4 in FIG. 4.

Shaft telescoping means 100 includes a fork 102 having vertical arms 104 and 105 having respective vertical slots therein, 106 and 107. A pin 108 passes through an opening 98a in first shaft portion 98. Pin 108 is retained within fork 102 by means of head 110, washer 112, and cotter pin 113 (FIG. 4A). Thus fork 102 is moveable relative to pin 108 and shaft 98 to the extent of vertical slots 106 and 107. Fork 102 is integral with a second shaft portion 114 of circular cross section. Second shaft portion 114 is integral with a second shaft telescoping means 120 (FIG. 2A). Second shaft telescoping means include a second fork 122. Second fork 122 includes a pair of arms 124 and 126 having respective vertical slots therein 125 and 127. A third shaft portion 128 of square cross section extends downwardly into fork 122 and a pin 130 extends through an opening 128a in shaft 128. Pin 130 includes a head portion 132, a washer 134 and cotter pin 135 arrangement in the manner as shown in FIG. 4A, to maintain the third shaft portion within the fork. Shaft 128 and pin 130 are moveable relative to fork 122 to the extent of vertical slots 125 and 127.

Figure 5:
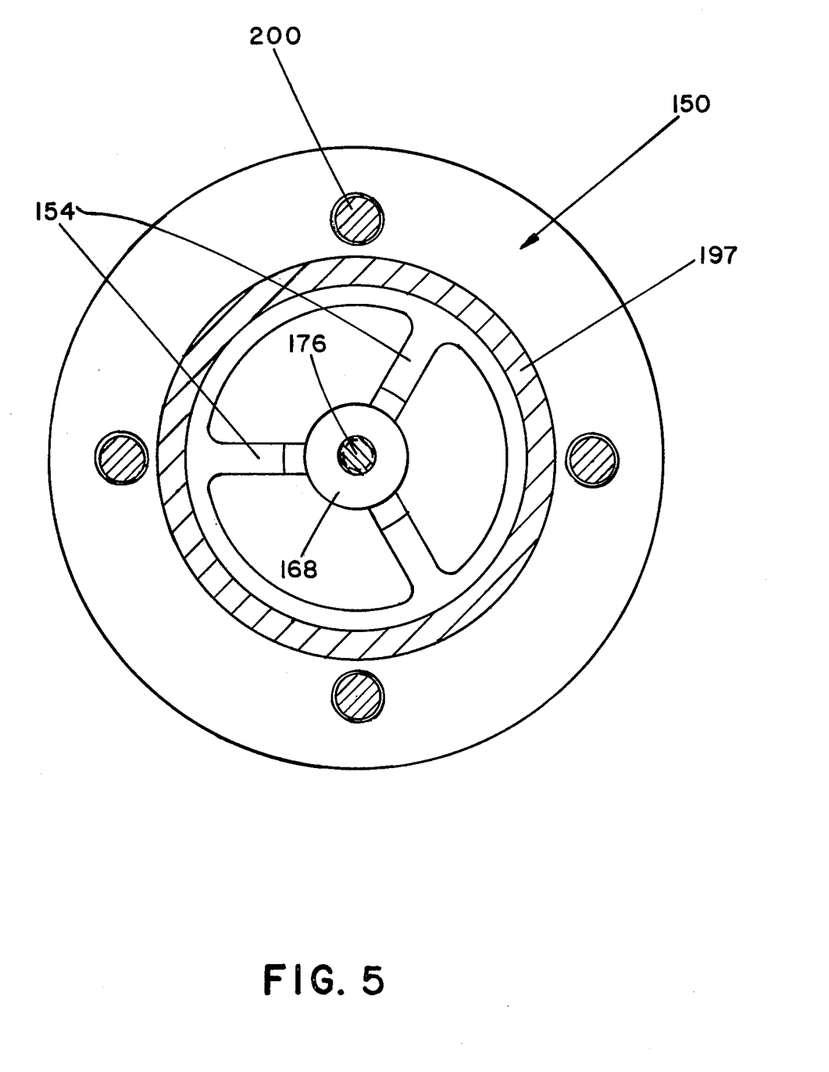
FIG. 5 is a sectional view looking in the direction of the arrows along the line 5—5 in FIG. 2A.

An air inlet and outlet valve assembly 140 is mounted in the top 141 of the tank 12. A mounting flange 142 is rigidly attached to an opening in the top of the tank 144. Flange 142 includes a groove 146 into which is placed a suitable seal 148. A shaft retainer 150 includes a flange portion 151 having a lower extension 152 which engages the seal 148. Retainer 150 includes a plurality of spokes 154 which extend inwardly as shown in FIG. 5.

Spokes 154 terminate in a circular center retaining portion 156.

Center retaining portion 156 is provided with a circular opening 158 to receive a fourth shaft portion 160. Shaft portion 160 is of circular cross section, is hollow, defining a center opening 161, and is provided with internal threads 162. A split collar rotating ring 164 mounted on circumferential shoulder 165 maintains a bearing washer 166 in engagement with the lower surface 167 of retainer center portion 156. An enlarged upper shaft portion 168 also maintains a bearing member 168a in engagement with the upper surface 169 of retainer center portion 156. Shaft portion 160 further includes an air escape and drain hole 161a for opening 161.

Figure 6:
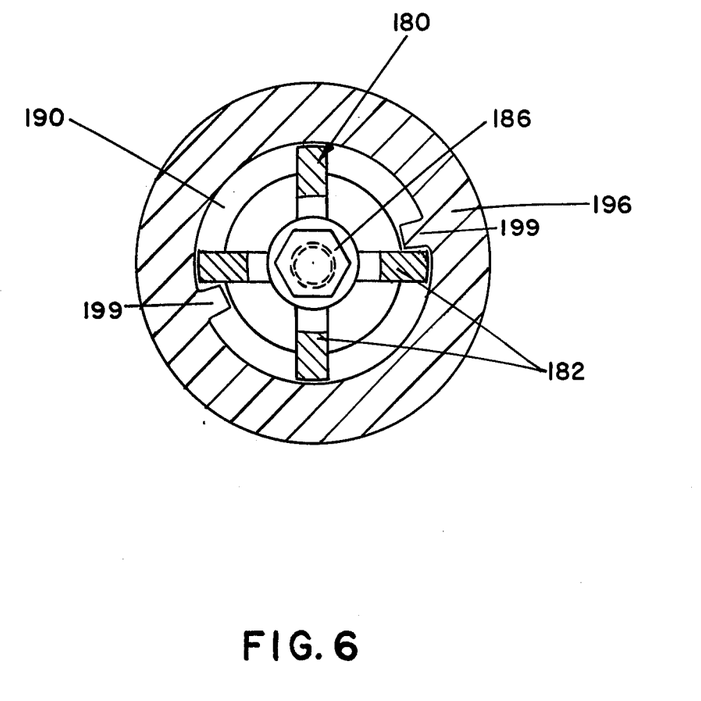
FIG. 6 is a sectional view looking in the direction of the arrows along the line 6—6 in FIG. 2A.

A valve member 170 includes a valve body 172 having a depending shaft portion 176 which is threaded at 178 to engage the threads 162 in fourth shaft portion 160. A valve guide 180 includes a series of wings 182 (FIG. 6) and an open center portion 184 where a fastener 186 is inserted through an opening 188 and engages the valve body 172 to hold valve guide 180 in place. The valve body 172 at 174 and the valve guide 180 at 181 are contoured to maintain a seal member 190 in place between them. The seal 190 has a horizontally extending portion 191 which engages a valve bonnet 192 having a bonnet flange portion 194, a seat portion 195 engaging horizontal seal portion 191, and a guide portion 196. A bonnet flange depending portion 197 engages a seal 198 in retainer groove 153. Fasteners 200 pass through the bonnet flange portion 194, retainer flange portion 151 and engage mounting flange 142 to maintain the upper portion of the air inlet and outlet valve assembly in place within the top 141 of tank 12. Projections 199 provided on guide portion 196 engage wings 182 (FIG. 6) and prevent rotation of valve 172 while allowing vertical movement thereof. Initial rotation of valve 172 will allow seal member 190 to wipe valve seat 195 until wings 182 engage projections 199.

A valve cap 202 is threaded at 204 to be removably placed upon the threaded external surface 206 of the bonnet guide portion 196. Valve cap 202 includes an opening 207 to allow air to enter the tank during unloading and allow air and vapors to leave the tank during loading. Valve cap protects threaded surface 206 for attachment of a conduit to direct dangerous lading vapors away from the car, and prevent moisture and debris from accumulating on bonnet 192 and valve guide 180.

In the operation of the device if the tank car is impacted and the tank top 141 moves downwardly relative to the tank bottom 12, retainer 150, fourth shaft portion 160 and third shaft portion 128 will move downwardly relative to second fork 122. Shaft portion 128 and pin 130 will move downwardly within slots 125 and 127. If the top of the tank moves downwardly a sufficient distance, third shaft portion 128 will bottom out in opening 123 in the bottom of second fork 122. This will then cause second shaft portion 114 and first fork 102 to move downwardly relative to first shaft portion 98 and pin 108 by virtue of slots 106 and 107 in arms 104 and 105. The combined distance of slots 125, 127; 106, and 107 are in excess of the contemplated amount of movement of the top of the tank relative to the bottom of the tank (about 3 inches) caused by in transit impacts to the tank car in railway classification yards.

After downward movement, the top of the tank will move upwardly after the impact. First fork 102 and second shaft portion 114 will move upwardly until the position shown in FIG. 2 is obtained. Similarly third shaft portion 128 and pin 130 will move upwardly relative to second shaft portion 114 and fork 122 to the position shown in FIG. 2A, as the entire tank top and air inlet and outlet valve assembly 140 move back to their original position. In some impacts there may be some back and forth vertical oscillation until the tank is again stabilized.

To open the air inlet and outlet valve during loading or unloading of the tank car, the cap 80 is first removed from the housing 42. Then handles 70 are rotated about pin 72a to the horizontal position shown in FIG. 3. Handles 70 are then utilized to rotate the shaft 46. Rotation of shaft 46 rotates first shaft portion 98, first telescoping means 100, second shaft portion 114, second telescoping means 120, third shaft portion 128 and fourth shaft portion 160. Rotation of fourth shaft portion 160 through engagement of threads 162 in fourth shaft portion 160 with cooperating threads 178 on valve depending portion 176 causes valve member 170 to be lowered, and moves seal 190 out of engagement with bonnet seat portion 195. During unloading of the lading through lading valve 30 (FIG. 1) air may then enter through the opening 207 in cap 202, flow through the space between seal 190 and bonnet seat 195, and then through the space between retainer spokes 154 and into the tank. During lading loading, air will exit through a reverse path.

The upper valve assembly 140 illustrated is not critical to the operation of the present invention. Other air inlet and outlet valve assemblies operated by a depending rotating shaft may be utilized.

Similarly the design of lower operating assembly 55 used to rotate the shaft 46 may vary considerably from that shown and described as will be apparent to those skilled in the art.

The important feature of the present invention is the provision of shaft telescoping means in the operating shaft extending from the bottom to the top of the tank to allow the upper portion of the shaft to telescope relative to the lower portion of the shaft, to allow the top to move downwardly relative to the bottom of the tank to prevent the valve member 140 from opening or becoming damaged when impacts to the car occur in transit.

While two sets of telescoping means have been illustrated only one telescoping means or more than two telescoping means may be utilized.

Furthermore the particular telescoping arrangement utilized may vary. Other arrangements for allowing the upper portion of the operating shaft to telescope relative to the lower portion of the operating shaft will be apparent to those skilled in the art.

What is claimed is:

1. An air inlet and oulet valve assembly for a railway tank car comprising:
a valve member mounted within an opening in the top of a railway tank car; an operating shaft extending from the bottom of the car, through the tank to the top of the tank to operate the valve; said operating shaft including shaft rotating means located at the bottom of the tank to raise and lower said valve member; and shaft telescoping means comprising at least one fork; said fork including a pair of vertically extending arms each having a vertical slot therein such that the upper part of the operating shaft is movable vertically within said slots relative to the lower portion of the shaft, as the top of the tank moves relative to the bottom of the tank; whereby when the car is impacted and the top of the tank moves downwardly relative to the bottom of the tank the upper portion of the operating shaft will move downwardly within said slots, and the valve will remain closed during such impacts; and whereby said valve member may be opened and closed from the bottom of the car by means of said shaft rotating means and said operating shaft.

2. An air inlet and outlet valve assembly according to claim 1 wherein a housing is provided in said tank and said shaft extends through a housing opening in said housing.

3. An air inlet and outlet valve assembly according to claim 2 wherein means for sealing said shaft relative to the tank are provided between said shaft and said housing in said housing opening.

4. An air inlet and outlet valve assembly according to claim 1 wherein said operating shaft has an opening therein through which a pin passes within said pair of slots, and wherein said pin and said shaft move vertically within the slots provided in the arms of the fork.

5. An air inlet and outlet valve assembly according to claim 4 wherein a pair of said forks are provided in said operating shaft.

6. An air inlet and outlet valve assembly according to claim 1 wherein at the top of the tank a retainer is provided having a circular center portion, said shaft has a threaded portion which extends within said retainer center portion, and wherein said valve member has a depending threaded portion which engages the threaded portion of said shaft and whereby rotation of said shaft causes vertical movement of said valve member relative to said retainer portion.

7. An air inlet and outlet valve assembly according to claim 6 wherein a valve bonnet extends above said retainer portion having a seat portion, and wherein said valve member has a seal member mounted therein which engages said bonnet seat portion.

8. An air inlet and outlet valve assembly according to claim 7 wherein said bonnet includes a guide portion and wherein said valve member has guide means which engage said bonnet guide portion during vertical movement of said valve member.

9. An air inlet and outlet valve assembly for a transportation tank comprising:
a valve member mounted within an opening in the top of the tank; an operating shaft extending from the bottom of the tank, through the tank, to the top of the tank to operate the valve; said operating shaft including shaft rotating means located at the bottom of the tank to raise and lower said valve member; and shaft telescoping means such that the upper part of the operating shaft is movable vertically relative to the lower portion of the shaft, as the top of the tank moves relative to the bottom of the tank; whereby when the top of the tank moves downwardly relative to the bottom of the tank, the upper portion of the operating shaft will move downwardly relative to the lower portion of the operating shaft, and the valve will remain closed during such movement; and whereby said valve member may be opened and closed from the bottom of the tank by means of said shaft rotating means and said operating shaft.

10. An air inlet and outlet valve assembly according to claim 9 wherein said shaft includes a plurality of shaft telescoping means in said shaft.

11. An air inlet and outlet valve assembly according to claim 10 wherein said shaft telescoping means comprise a pair of forks.

12. An air inlet and outlet valve assembly according to claim 9 wherein said shaft telescoping means comprise at least one fork.

13. An air inlet and outlet valve assembly according to claim 12 wherein said fork comprises a pair of arms each having a slot therein, and wherein said shaft has an opening therein through which a pin passes and wherein said pin and said shaft move vertically within slots provided in each of the arms in the fork.

14. An air inlet and outlet valve assembly according to claim 9 wherein a housing is provided in said tank and said shaft extends through a housing opening in said housing.

15. An air inlet and outlet valve assembly according to claim 14 wherein means for sealing said shaft relative to the tank are provided between said shaft and said housing in said housing opening.

16. An air inlet and outlet valve assembly according to claim 9 wherein said shaft rotating means includes at least one handle.

17. An air inlet and outlet valve assembly according to claim 9 wherein at the top of the tank a retainer is provided having a circular center portion, said shaft has a threaded portion which extends within said retainer center portion, and wherein said valve member has a depending threaded portion which engages the threaded portion of said shaft and whereby rotation of said shaft causes vertical movement of said valve member relative to said retainer portion.

* * * * *